United States Patent Office 3,462,419
Patented Aug. 19, 1969

3,462,419
PREPARATION OF 1,4-BENZODIAZEPINE
COMPOUNDS
John L. Spencer, Indianapolis, Ind., assignor to Eli Lilly
and Company, Indianapolis, Ind., a corporation of
Indiana
No Drawing. Filed Mar. 23, 1962, Ser. No. 182,106
Int. Cl. C07d 53/06
U.S. Cl. 260—239                                    2 Claims This invention relates to novel derivatives of 1,4-benzodiazepine and to a method for preparing such derivatives.

The compounds of this invention may be represented by the formula

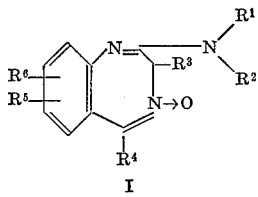

I wherein $R^1$ and $R^2$, taken separately, represent an alkyl group containing from one to three carbon atoms, and $R^1$ and $R^2$, when taken together with the nitrogen atom to which they are attached, represent a pyrrolidine ring, $R^3$ represents hydrogen or lower alkyl containing one to five carbon atoms, $R^4$ represents phenyl, halophenyl, lower alkylphenyl, nitrophenyl or lower alkoxyphenyl, and $R^5$ and $R^6$ represent hydrogen or halogen.

Preparation of the compounds of this invention is accomplished by treating a 2-α-haloalkyl-4-arylquinazoline-3-oxide represented by the formula

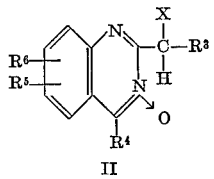

II wherein X is halogen and $R^3$, $R^4$, $R^5$, and $R^6$ have the same meaning as in Formula I, with a secondary amine under suitable conditions. In the reaction, rearrangement and ring enlargement take place with the resulting formation of the desired 1,4-diazepine-4-oxide. The conditions under which such rearrangement and ring enlargement occur constitute one of the aspects of this invention.

Certain amine derivatives of 1,4-benzodiazepine-4-oxide are known in the art and have been described by Sternbach and Reeder, J. Org. Chem. 26 (1961), 1111 and by Bell et al., J. Med. and Pharm. Chem., 5 (1962), 63. However, in each case, the amino group is a primary or secondary amine. Compounds described by Formula I in which the amino group is a tertiary amine have not been known prior to this invention, and, in fact, both of the cited references teach that the reaction of a 2-α-haloalkyl-4-arylquinazoline-3-oxide with a secondary amine does not lead to a rearranged product but that, rather, a 2-α-dialkylaminoalkyl-4-arylquinazoline is formed, resulting from a normal replacement of halogen by the amino group.

It has now been found that, under suitable reaction conditions, a 2-dialkylamino-1,4-benzodiazepine-4-oxide can be prepared by reacting a secondary amine with an appropriately substituted 2-α-haloalkyl-4-arylquinazoline-3-oxide. The reaction is conducted in a solvent medium comprising water, a water-miscible organic hydroxylic solvent such as methanol, ethanol, and the like, an excess of the secondary amine employed in the reaction, or a mixture of such solvents, at low temperatures, preferably in the presence of an inorganic base. By inorganic base in this instance is meant an alkali or alkaline earth hydroxide, such as sodium hydroxide, potassium hydroxide, barium hydroxide, and the like, a quaternary ammonium hydroxide, such as, for example, tetramethylammonium hydroxide, or an alkali-metal alcoholate, such as sodium methoxide, sodium ethoxide, potassium tertiary butoxide and the like.

The temperature at which the reaction is conducted is determined by the other variables such as the nature of the solvent, the presence or absence of inorganic base, the nature of the secondary amine, and the nature of the quinazoline derivative employed as an intermediate. In general, it may be said that reaction temperatures between about minus 80° C. and ice-bath temperature can be employed. In the absence of water or inorganic base, temperatures between about minus 50° C. and about minus 80° C. are preferred. Thus, for example, reactions carried out in methanol or excess dimethylamine require reaction temperatures below about minus 50° C. in order to obtain adequate yields of the 2-dimethylamino derivative. On the other hand, satisfactory yields of the 2-pyrrolidino derivative can be obtained when the reaction is carried out at ice-bath temperatures in methanol. The addition of an inorganic base in all instances improves yields, so much so that, for example, excellent yields of the 2-dimethylamino derivative can be obtained by conducting the reaction at ice-bath temperatures in methanol having dissolved therein sodium methoxide. Under all conditions, a large excess of amine is desirably employed.

The desired 2-dialkylamino - 1,4 - benzodiazepine-4-oxides can be recovered from the reaction mixtures by employing crystallization or extraction techniques. In the latter instances, it is preferred to concentrate the reaction mixture in vacuo to remove volatile materials before proceeding with the isolation of the product.

Typical of the amines which can be employed in the invention are dimethylamine, diethylamine, ethylmethylamine, methylpropylamine, dipropylamine, pyrrolidine, piperidine and the like. Illustrative of the benzodiazepine derivatives which can be prepared are the following:

7-chloro-2-dimethylamino-5-phenyl-3H-1,4-benzodiazepine-4-oxide
7-chloro-2-diethylamino-5-phenyl-3H-1,4-benzodiazepine-4-oxide
7-chloro-2-dipropylamino-5-phenyl-3H-1,4-benzodiazepine-4-oxide
7-chloro-2-ethylmethylamino-5-phenyl-3H-1,4-benzodiazepine-4-oxide
7-chloro-2-methylpropylamino-5-phenyl-3H-1,4-benzodiazepine-4-oxide
7-chloro-2-pyrrolidino-5-phenyl-3H-1,4-benzodiazepine-4-oxide
7-chloro-2-piperidino-5-phenyl-3H-1,4-benzodiazepine-4-oxide
7-chloro-2-dimethylamino-5-p-chlorophenyl-3H-1,4-benzodiazepine-4-oxide
7-chloro-2-ethylmethylamino-5-p-chlorophenyl-3H-1,4-benzodiazepine-4-oxide
7-chloro-2-pyrrolidino-5-p-chlorophenyl-3H-1,4-benzodiazepine-4-oxide
2-dimethylamino-5-phenyl-3H-1,4-benzodiazepine-4-oxide
2-pyrrolidino-5-phenyl-3H-1,4-benzodiazepine-4-oxide
2-dimethlamino-5-p-chlorophenyl-3H-1,4-benzodiazepine-4-oxide
2-pyrrolidino-5-p-chlorophenyl-3H-1,4-benzodiazepine-4-oxide The 2-dialkylamino-1,4-benzodiazepine-4-oxides can be reduced to the corresponding 2-dialkylamino-1,4-benzodiazepines by known procedures, as for example, by heating with phosphorus trichloride. They can also be reduced catalytically, for example with catalysts such as platinum oxide and the like, to the corresponding 4,5-dihydrobenzodiazepines. Both classes of compounds so derived are also within the scope of this invention.

The novel compounds provided by this invention are useful as anticonvulsants and are also valuable psychotherapeutic agents. For these purposes the compounds can be administered either orally or parenterally, either as such or in the form of salts formed with pharmaceutically acceptable acids. Such salts can be formed in the conventional manner from acids such as hydrochloric, hydrobromic, sulfuric, phosphoric, tartartaric, maleic, salicylic, acetic, and like acids.

In order to describe more fully the invention, the following specific examples are given by way of illustration:

EXAMPLE 1

To 100 ml. of 25 percent methanolic dimethylamine which had been cooled in an acetone-Dry Ice bath to about minus 60° C. there were added 5 g. of 6-chloro-2-chloromethyl-4-phenylquinazoline-3-oxide. The mixture was stirred for four hours while the temperature was maintained at about minus 60° C. The acetone-Dry Ice bath was then replaced by a salt-ice-methanol cooling bath which was allowed to attain room temperature while stirring was continued. The mixture was then stirred at room temperature overnight. The solution so obtained was concentrated to dryness in vacuo, and the residue was dissolved in a mixture comprising 25 ml. of water and 10 ml. of 10 percent hydrochloric acid. This solution was washed with ether and was then stirred while the pH was adjusted to pH 6 by the dropwise addition of a 10 percent aqueous sodium carbonate solution. A sticky gum separated which solidified upon the addition of about 10 ml. of ether. The crude product was collected by filtration and washed with water and ether. The product so obtained melted at 185–193° C. Upon recrystallization from ethanol the 7-chloro-2-dimethylamino-5-phenyl - 3H - 1,4-benzodiazepine-4-oxide melted at about 200–203° C.

*Analysis.*—Calculated: C, 65.07; H, 5.13; N, 13.39; Cl, 11.30. Found: C, 65.08; H, 5.06; N, 13.12; Cl, 11.30.

EXAMPLE 2

To 100 ml. of 25 percent aqueous dimethylamine cooled to about 0° C. there were added with stirring 5 g. of 6-chloro-2-chloromethyl-4-phenylquinazoline-3 - oxide. The reaction mixture was kept at about 0° C. for six hours and was then allowed to warm to room temperature. Stirring was maintained throughout this period and was continued overnight. The product was isolated by employing the procedure described in Example 1. The partially purified product melted at about 190–195° C.

EXAMPLE 3

An ice-cold solution of 25 ml. of dimethylamine in 75 ml. of 50 percent aqueous methanol was commingled with 10 g. of 6-chloro-2-chloromethyl-4-phenylquinazoline-3-oxide. The reaction mixture was kept cold in an ice bath and stirred for an hour after the addition of the chloromethyl compound had been completed and was then allowed to warm to room temperature. The mixture was diluted with 50 ml. of water and the methanol and excess dimethylamine were removed in vacuo. The remaining mixture was further diluted with another 50 ml. of water and the resulting precipitated solid was collected by filtration. The solid was partially purified as described in Example 1. The material so obtained melted at about 188–193° C. and weighed 2.5 g.

EXAMPLE 4

To 50 ml. of anhydrous dimethylamine which had been cooled to about minus 70° C. there were added with stirring 5 g. of 6-chloro-2-chloromethyl-4-phenylquinazoline-3-oxide. Stirring was continued for twelve hours at about minus 70° C. Cooling was then discontinued and the excess dimethylamine was permitted to evaporate. The residue was partially purified according to the method described in Example 1. The 7-chloro-2-dimethylamino-5-phenyl-3H-1,4-benzodiazepine-4 - oxide obtained by this procedure melted at about 193–198° C. and weighed 2.2 g.

EXAMPLE 5

A solution of 2 g. of potassium hydroxide in 50 ml. of methanol was prepared and cooled in an ice bath while 50 ml. of 50 percent methanolic dimethylamine were added. Cooling was continued while 10 g. of 6-chloro-2-chloromethyl - 4 - phenylquinazoline-3-oxide were added with stirring. After an hour, the ice bath was removed and stirring was continued overnight. The product was isolated as in Example 3. There were obtained 6.5 g. of material melting at about 188–194° C.

EXAMPLE 6

The reaction step of Example 5 was repeated. In recovering the product, however, the reaction mixture was diluted with 50 ml. of water and the excess dimethylamine and methanol were removed under vacuum. The resulting crude solid was recrystallized directly from methanol to yield 5.5 g. of a product melting at about 198–201° C.

EXAMPLE 7

A solution of 2 g. of sodium methoxide in 50 ml. of methanol was commingled with 50 ml. of a 50 percent methanolic solution of dimethylamine, and was then cooled in an ice bath while 10 g. of 6-chloro-2-chloromethyl-4-phenylquinazoline-3-oxide were added with stirring. The ice bath was removed after an hour and the reaction mixture was stirred at room temperature. The crude product was isolated as in Example 3. The yield of partially purified 7-chloro-2-dimethylamino-5-phenyl-3H-1,4-benzodiazepine-4-oxide was 9.2 g.

EXAMPLE 8

An ice-cold solution of 30 ml. of pyrrolidine in 70 ml. of methanol was commingled while being stirred with 10 g. of 6-chloro-2-chloromethyl-4-phenylquinazoline-3-oxide. After being stirred for about 20 minutes, during which time the reaction mixture became clear and a new solid precipitated, the mixture was allowed to warm to room temperature and stirring was continued overnight. The reaction mixture was chilled and the solid was collected by filtration and washed with a little methanol. Recrystallization from ethanol afforded 6 g. of 7-chloro-2-pyrrolidino - 5 - phenyl-3H-1,4-benzodiazepine-4-oxide melting at about 197–198° C.

*Analysis.*—Calculated: C, 67.15; H, 5.34; N, 12.37; Cl, 10.44. Found: C, 67.14; H, 4.60; N, 11.95; Cl, 10.37.

EXAMPLE 9

A solution comprising 2.3 g. of potassium hydroxide, 50 ml. of methanol and 50 ml. of 50 percent methanolic dimethylamine was cooled in an ice bath and commingled with 10 g. of 2 - chloromethyl-4-phenylquinazoline-3-oxide. After an hour the cooling bath was removed and the mixture was stirred at room temperature overnight. The reaction mixture was diluted with water and the methanol and excess amine were removed under vacuum. An oily substance separated but could not be crystallized. The mixture was shaken with benzene, precipitating a white solid material which was discarded. The benzene layer was extracted with 10 percent hydrochloric acid and the acid extract was adjusted to pH 7 with 10 percent aqueous sodium carbonate solution. Again an oily material separated which, upon being stirred with ether, solidified. The product was collected by filtration and washed with water and ether. Recrystallization from methanol afforded pure 2 - dimethylamino-5-phenyl-3H-1,4-benzodiazepine-4-oxide melting at about 192–195° C.

*Analysis.*—Calculated: N, 15.04. Found: N, 15.00.

EXAMPLE 10

To a solution of 5 g. of 7-chloro-2-dimethylamino-5-phenyl-3H-1,4-benzodiazepine-4-oxide in 75 ml. of chloroform were added 9.5 ml. of phosphorus trichloride. The mixture was heated under reflux for one hour and was then concentrated to dryness in vacuo. The residue was stirred with a little methylene chloride, ice, and sufficient 50 percent aqueous potassium hydroxide to make the solution basic. The solid 7-chloro-2-dimethylamino-5-phenyl-3H-1,4-benzodiazepine so prepared was collected by filtration, washed with water and acetone, and recrystallized from acetone; M.P. about 178–180° C.

*Analysis.*—Calculated: C, 68.55; H, 5.41. Found: C, 68.01; H, 5.57.

EXAMPLE 11

A solution of 8 g. of 7-chloro-2-pyrrolidino-5-phenyl-3H-1,4-benzodiazepine-4-oxide in 100 ml. of chloroform was mixed with 10 ml. of phosphorus trichloride. The solution was heated under reflux for one hour and was then concentrated to dryness under vacuum. The residue was stirred with methylene chloride, ice, and sufficient 50 percent aqueous potassium hydroxide solution to make the solution basic. The organic layer was drawn off, washed with water, dried over anhydrous magnesium sulfate, and filtered to remove the drying agent. The filtrate was concentrated to dryness in vacuo and the residue was dissolved in 25 ml. of acetone. A solid precipitate separated upon standing, and this was separated by filtration and recrystallized from methanol to give 7 - chloro - 5 - phenyl-2-pyrrolidino-3H-1,4-benzodiazepine melting at about 135–138° C.

*Analysis.*—Calculated: C, 70.48; H, 5.60. Found: C, 70.40; H, 5.58.

EXAMPLE 12

A solution of 4 g. of 7-chloro-2-dimethylamino-5-phenyl-3H-1,4-benzodiazepine-4-oxide in 200 ml. of ethanol containing 4 ml. of concentrated hydrochloric acid was hydrogenated at room temperature in the presence of 400 mg. of platinum dioxide with an initial hydrogen pressure of about 20 p.s.i. Two molar equivalents of hydrogen were consumed. The mixture was diluted with sufficient ethanol to effect solution of the organic material and was then filtered to remove the catalyst. Concentration of the filtrate in vacuo yielded 7-chloro-2-dimethylamino - 5 - phenyl-4,5-dihydro-3H-1,4-benzodiazepine dihydrochloride melting with decomposition at about 240–245° C.

*Analysis.*—Calculated: N, 11.27. Found: N, 11.46.

I claim:

1. A method for preparing a compound of the formula

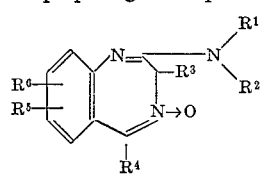

wherein $R^1$ and $R^2$, taken separately, are alkyl containing from one to three carbon atoms, and $R^1$ and $R^2$, when taken together with the nitrogen atom to which they are attached, represent a pyrrolidine ring, $R^3$ is selected from the class consisting of hydrogen and lower alkyl containing from one to five carbon atoms, $R^4$ is selected from the class consisting of phenyl, lower alkylphenyl, halophenyl, nitrophenyl, and lower alkoxyphenyl, and $R^5$ and $R^6$ are selected from the class consisting of hydrogen and halogen, which comprises reacting a 2-α-haloalkyl-4-arylquinazoline-3-oxide with a secondary amine of the formula

wherein $R^1$ and $R^2$ have the above-assigned meanings, in a solvent selected from the class consisting of water, water-miscible organic hydroxylic solvents, and amine solvents of the formula

at a temperature between about minus 80° C. and ice-bath temperature in the presence of a base selected from the group consisting of the alkali metal hydroxides, the alkaline earth metal hydroxides, the quaternary ammonium hydroxides, and the alkali metal alcoholates.

2. A method for preparing 7-chloro-2-dimethylamino-5-phenyl-3H-1,4-benzodiazepine-4-oxide which comprises reacting 6-chloro-2-chloromethyl-4-phenylquinazoline-3-oxide with an excess of dimethylamine at a temperature between about minus 80° C. and ice-bath temperature, said reaction being conducted in methanol having sodium methoxide dissolved therein, and recovering the product so formed.

References Cited

UNITED STATES PATENTS 2,893,992   7/1959   Sternbach _____ 260—239

OTHER REFERENCES

Jour. of Org. Chem., vol. 26, pp. 1111–18 (1961), Sternbach.

Jour. of Medicinal and Pharmaceutical Chemistry, vol. 5, No. 1, pp. 63–68 (1962), Bell et al.

ALTON D. ROLLINS, Primary Examiner

U.S. Cl. X.R.

260—251, 293, 294, 294.7, 326.3, 326.5, 326.81